ization">United States Patent [19]

Trivett

[11] Patent Number: 5,137,956
[45] Date of Patent: Aug. 11, 1992

[54] SOLID FILM PRELUBE FDA APPROVABLE FOR INCIDENTAL FOOD AND BEVERAGE CONTACT

[75] Inventor: Robert L. Trivett, Aurora, Ill.

[73] Assignee: Nalco Chemical Company, Naperville, Ill.

[21] Appl. No.: 753,462

[22] Filed: Sep. 3, 1991

[51] Int. Cl.$^5$ ............................................. C08L 31/02
[52] U.S. Cl. ...................................... 524/318; 524/320; 524/322; 252/56 R
[58] Field of Search ...................... 524/318, 320, 322; 252/56 R

[56] References Cited

U.S. PATENT DOCUMENTS

| | | | |
|---|---|---|---|
| 4,157,990 | 6/1979 | Lindner et al. | 524/314 |
| 4,340,513 | 7/1982 | Moteki et al. | 524/13 |
| 4,421,886 | 12/1983 | Worschech et al. | 524/310 |
| 4,846,986 | 7/1989 | Trivett | 252/56 R |
| 5,069,806 | 12/1991 | Trivett | 252/52 A |

Primary Examiner—Paul R. Michl
Assistant Examiner—LaVonda R. DeWitt
Attorney, Agent, or Firm—Robert A. Miller; John G. Premo; Joseph B. Barrett

[57] ABSTRACT

A solid film prelube composition for metals contacting food and beverages which comprises:

| Ingredients | % by Weight |
|---|---|
| A. As a primary lubricant, a $C_{14}$-$C_{22}$ fatty acid | 75-95 |
| B. As a plasticizer-supplemental lubricant, butyl stearate | 5-25 |
| C. As a film former, an ethylene acrylic acid copolymer | 0.5-2 |
| D. As an antioxidant, 2,6-di-tertiary-butyl-para-cresol | 0-2 |

4 Claims, No Drawings

SOLID FILM PRELUBE FDA APPROVABLE FOR INCIDENTAL FOOD AND BEVERAGE CONTACT

TECHNICAL FIELD OF THE INVENTION

The present invention is in the technical field of metalworking operations, specifically stamping and drawing and the lubricants used therein, particularly solid film (dry film) prelubes for containers subject to contact with food and beverages.

BACKGROUND OF THE INVENTION

Lubricants, especially solid film prelubes, are utilized in several metalworking operations. These metalworking operations can include stamping, drawing, forming, bending, rolling, cutting, grinding, punching, sawing, hobbing, reaming, spinning, extruding, trepanning, coining, swagging, and the like. The present invention concerns the use of solid film (dry film) prelube lubricants for such type of metalworking operations, utilized on ferrous and non-ferrous metals used to make containers which come in contact with food and beverages. Most often food and beverage containers are composed of either stainless steel or one of a variety of aluminum alloys. The term, press working operation, is used to define all mechanical processes where sheet metal is formed into specific shapes by the use of mechanical presses. Such operations can further be categorized as stamping and drawing. The term, stamping, is further used to describe all forming operations where parts are formed from sheet metal and there is no change in the gauge or thickness of the sheet metal. The term, drawing, is further arbitrarily divided into shallow drawing and deep drawing. Drawing defines all forming operations where there is a change or reduction in the gauge or thickness of the sheet metal. Shallow drawing can be defined as to the forming of a cup or shape no deeper than one-half its diameter with only small reductions in the metal gauge or thickness. Deep drawing can be defined as to the forming of a cup or shape deeper than half its diameter with substantial reductions in metal thickness or gauge. Formed food and beverage containers may be produced by one or a combination of these three fundamental fabrication metalworking operations.

Forming lubricants, especially solid film prelubes, facilitate these operations by reducing the friction that occurs between the sheet metal being fabricated and the tooling employed for the forming operation. By reducing the coefficient of friction for the specific forming process, power requirements, tool wear and heat generated during forming operations are all diminished. Heat significantly can affect forming operations by changing metallurigical properties of both the metal and tooling. It physically degrades these elements, causes their staining or oxidation and also creates physical and chemical changes in the lubricant affecting its performance. In addition, blocking or adhesion between the sheet metal and tooling is reduced or eliminated during the forming operations, transit and storage of the formed parts.

The prevention of blocking or adhesion between the sheet metal and tooling is of extreme importance. In addition, the use of specific metalworking forming lubricants such as solid film prelubes significantly can reduce or eliminate the production of scrap parts (formed parts rejected due to physical damage) which may result from the failure of some forming lubricants.

Solid film prelubes have been proven to work in virtually any drawing or stamping operation, it simply being a necessity of correctly matching product chemistry and coating weights with the application. They have not been used in the drawing containers used in a variety of applications where incidental food and beverage contact may occur between the contaminated container and the actual food or beverage product. All of these containers, for example, (food containers such as cans, bakeware, baking containers used in process) would normally be thoroughly cleaned in aqueous acid or alkaline cleaners following forming before being sent to their actual application. This is normally done to remove any and all traces of lubricant in order to provide a clean container. Furthermore, such containers could be exposed to further processing such as the application of organic coatings. Thus, if trace amounts of lubricant were to remain following cleaning, situations might arise where incidental food or beverage contact could occur. Trace amounts of lubricants could also impact on the adherence of organic coating. This could lead to potential contamination. A variety of lubricants are currently used to form these types of containers. They are all liquid lubricants and generally are composed of blends of hydrocarbon oils, vegetable oils and additives. Many of these products are not FDA approved for incidental food contact. In additions, these products often are only satisfactory lubricants depending upon the severity of the forming operations. Large quantities of parts will often be rejected due to surface defects or metal ruptures due to improper lubrication. These lubricants are also often applied at high coating weights, following the adage that more oil will lubricate better. The advantages of a solid film prelube formulation is that it offers several benefits over current products:

1. All components would be FDA approvable for incidental food and beverage contact eliminating the worry associated with health concerns if contamination did occur.
2. It would offer substantial improvements in lubrication over the current regime of products being used, reducing or eliminating scrap parts.
3. Furthermore, it would offer some of the other benefits associated with solid film prelubes, namely the elimination of inhouse lubrication systems (chemical and drum storage) and significant reductions in coating weights currently being applied. 25-350 mg/ft$^2$ could be used versus 500-1500 mg/ft$^2$ currently being used for hydrocarbon-based lubricants.
4. Such a product should also offer excellent long-term corrosion protection for metal coils or blanks stored in-process prior to forming, cleaning or finishing. Furthermore, the product should be removable, cleanable and compatible with the existing aqueous cleaners being used to process current lubricants.

THE INVENTION

A solid film prelube composition suitable for use in forming containers subject to contact with food which comprises:

| Ingredients | % by Weight |
| --- | --- |
| A. As a primary lubricant, C14-C22 fatty acid | 75-95 |
| B. As a plasiticizer-supplemental lubricant, butyl stearate | 5-25 |
| C. As a film former, an ethylene | 0.5-2 |

| Ingredients | % by Weight |
|---|---|
| acrylic acid copolymer and optionally, | |
| D. As an antioxidant, 2,6-di-tertiary-butyl-para-cresol | 0–2 | with ingredients A-D being FDA approved for incidental contact with food.

The Fatty Acids

The active lubricant is a fatty acid containing from 14 to 22 carbon atoms. It may contain branch substituents such as -OH. The preferred acids are saturated. They may be mixed acids of the types commonly found in animal fats and vegetable oils.

In preferred embodiments, the substantially saturated fatty acid is formed from the hydrogenation of castor oil, more specifically the hydrogenation of ricinoleic acid (12-hydroxyoleic) which comprised 89.7 percent by weight of castor oil.

In more preferred embodiments, the substantially saturated fatty acid is 12-hydroxystearic acid, resulting from the hydrogenation of ricinoleic acid. Ricinoleic acid is an 18 carbon acid with a double bond in the 9–10 position and a hydroxyl group on the twelfth carbon atom. Saturation of such double bonds converts each hydroxyoleic chain to hydroxystearic. A most preferred 12-hydroxystearic acid is Cenwax A manufactured by Union Camp Corporation with an acid value of 175–185, saponification value of 185–190, melting point of 76 to 78 degrees celsius and maximum Gardner color of 11.

The Antioxidant

The preferred antioxidant is a food grade hindered phenol antioxidant, 2,6-di-tertiary-butyl-para-cresol with a melt point of 147° F. Other antioxidants including other hindered phenols and diphenylamines are also expected to perform as antioxidants without the scope of this invention. Additionally, other materials known to be antioxidants will perform in the formulas of this invention.

The ethylene copolymer is a copolymer of ethylene and acrylic acid which promotes film foundation and adhesion of the solid film coating to all metal substrates, both during molten application stage and in the applied coating itself. The ethylene-acrylic acid copolymer is a composition having a melting point from 210° to 220° F., an acid value of about 75 with a hardness of from 1 to 6 dmm at 77° F. with a viscosity of 650 centripoise at 285° F. The most preferred ethylene-acrylic acid copolymer is A-C 580 manufactured by Allied Corporation. Other ethylene-vinyl functional monomer copolymers meeting the above described hardness limitation and having a melting point of between 160° F. to 200° F. will also function. It should be pointed out that the inclusion of an antioxidant, while preferable, is not critical. The antioxidant used in the lubricants of the invention is believed to be functional to stabilize the lubricant during application and prevent its deterioration on metal surfaces during exposure to the elements or during periods of protracted storage. The antioxidant is generally used at a level of 0–5% preferably 0.5–2% by weight of the composition.

The Plasticizer

The plasticizer is butyl stearate. Butyl stearate, being a high quality fatty ester with low viscosity, good color and low odor, also functions as a supplemental boundary lubricant in the formulation. The most preferred butyl stearate is n-Butyl Stearate, Uniflex BYS manufactured by Union Camp Corporation which is a clear liquid at ambient temperature with an acid value of 0.8, saponification value of 175, refractive index of 1.442 at 25° C. and a specific gravity of 0.86 at 25° C. In addition, other plasticizer compounds which would be compatible with 12-hydroxystearic acid, offer supplemental boundary lubrication and be F.D.A. approvable include castor oil, ricinoleic acid, soybean oil, rapeseed oil, corn oil, sunflower oil, canola oil and mixtures thereof.

A typical composition of the invention referred to hereafter as Composition A comprises:

| Ingredients | % by Weight |
|---|---|
| A. 12-Hydroxystearic Acid | 88 |
| B. Butyl-Stearate | 10 |
| C. Ethylene Acrylic acid Copolymer | 1 |
| D. 2,6-di-tertiary-butyl-para-cresol | 1 |

Composition 1 has a melt point of 165° F. and all components are sanctioned under FDA paragraph (FDA approved), 21 CFR, Part 178-Indirect Food Additives: Adjuvants, Production Aids and Sanitizers; Paragraph 178.3570-Lubricants with Incidental Food Contact.

Use of the Lubricant

The lubricant according to the present invention, provides a solid film prelube particularly useful in metalworking operations and particularly advantageous for the forming (all drawing and stamping operations) of containers used both for the processing and packaging of food and beverages. The present invention provides the necessary lubrication for the forming of such containers because of the solid nature of the coating itself and in addition the necessary corrosion protection required in process for such containers. Most particularly, such coating is compatible with all post processing operations including cleanability and removability. This includes the possibility where such coatings may not totally be removed resulting in the contamination of food or beverage products during processing or packaging. Such contamination could affect physical (appearance or stability) and chemical (taste) properties of the food or beverage but have no undesirable or unhealthy effects upon a person or animal consuming such product, since all components of the described invention are FDA approved for incidental food contact. The lubricant according to the present invention, as described is one that is solid at ambient temperatures and can be applied in a molten state at temperatures from 5°–40° F. above their melt point to all ferrous and non-ferrous metals.

The lubricant, according to the present invention, may successfully be coated onto a variety of metal substrates including all ferrous and non-ferrous metals by passing the substrate through a liquid bath at elevated temperatures, applying the lubricant by rollcoating, removing the excess by squeegy and then cooling the coating and substrate to ambient temperature.

For commercial applications, the solid film prelube composition may be applied via an electrostatic spray, by dipping the metal through a bath containing the composition or by running the metal through a rollcoater. A series of moving coating rolls will apply the composition to a moving metal strip (from coating pans containing the composition) as the strip runs between the rolls. A variety of coating variables including metal strip speed, speed of the coating rolls, size, number and composition of the rolls, composition viscosity and dilution, pressure of the rolls on the metal strip, gap sizes between the metal strip and coating rolls and temperature of the metal strip and solid film prolube composition all will determine the final coating weights applied.

The preferred method of application to ferrous and non-ferrous metals is applying the solid film prelube composition via a rollcoater to the metal strip at the exit end of a typical rolling mill at the inspection station prior to coiling the strip. The composition can be warmed to an application temperature of up to 205° F. Metal strip can efficiently be coated at line speeds from a minimum of 25 ft./minute to a maximum of 4000 ft./minute with 400-500 ft./minute being the optimum. Metal strip entering the rollcoater should have a peak metal temperature ranging from a minimum of ambient temperature to a maximum of 170° F. As a solid film prelube composition was applied to a metal strip under these coating variables, the described invention can be applied at coating weights from 25 to 350 mg/ft$^2$. The coating may need to be reflowed using a series of ovens. The application of an ambient air temperature quench across the strip immediately after the rollcoater and prior to the coiling station may be necessary to cool the coil down to the ambient temperature conditions before rewinding of the coil.

As mentioned earlier, the properties of corrosion prevention and forming lubrication capabilities of the solid film prelube composition for all metal surfaces are both highly dependent to a significant degree upon the uniformity of lubricant coating film on the metal substrate. Performance properties of prelube compositions, especially solid film prelubes, are greatly enhanced and advanced by the presence of a uniform and homogenous coating on the metal substrate until such time during which the coating is removed by some form of cleaning operation. The lubricant, according to the present invention, offers this important performance advantage in that it is a solid, consistent and continuous coating which is retained on the metal substrate until such time removability is called for.

The lubricant of the present invention is particularly useful as a solid film prelube coating for applications on all types of ferrous and non-ferrous metals and other metal substrates in the food, beverage and general manufacturing industries. Its performance properties, however, also would make it an excellent lubricant selection for prelube operations outside such applications and within such applications may also be applied to all work elements, tooling such as dies, the like and metal substrates.

Despite the variety of coating methods, the solid film prelube composition for all ferrous and non-ferrous metals forms a uniform and homogenous coating which is hard, pliable, non-blocking, odorless and non-hygroscopic on all types of metals exhibiting excellent surface adhesion and wetting properties.

The advantage and utility of the solid prelube composition, according to the present invention, are further described in the following listed examples.

EXAMPLE 1

A hot melt, solid film prelubricant especially adapted for the lubrication and corrosion protection of containers used in both the production and packaging of food and beverage products was prepared. This lubricant was designed to be used in the manufacture of containers composed of ferrous and/or non-ferrous metals and offers the property of being compatible with post processing operations for such containers. All components of the lubricants are F.D.A. approved for incidental food contact and the lubricant is designed to be compatible with most food and beverage products. The lubricant was prepared as follows:

One blending vessel was equipped with mechanical means of heating and stirring was used. The vessel was well insulated to allow for both uniform heating and cooling.

The following ingredients were added and mixed in the vessel: 88.0 parts by weight of 12-hydroxystearic acid, commercially available under the registered trademark of Cenwax A from Union Camp Corporation: 1.0 part by weight of a food grade antioxidant available commercially under the Shell trademark Ionol CP; 1.0 parts by weight of an ethylene-acrylic copolymer, commercially available under the Allied Corporation trademark A-C 580: and 10.0 parts by weight of n-butyl stearate, commercially available under the registered trademark of Uniflex BYS from Union Camp Corporation.

The blend of components was heated with moderate agitation to 180° F. and stirred until all components have melted and the blend was uniform and homogenous in color and appearance. Heat was then shut off and mixture cooled by gentle mixing to 170° F. before final packaging. The final product is a hard, tannish solid with a mild aroma and a homogenous form and consistency. The product can be characterized as follows:

Appearance: Tan solid
Odor: Fatty acid aroma
Melt Point (°F.): 160-170
Acid Value: 150-165
Specific Gravity: 0.882-0.894
Pentrometer
Hardness (0.25° C.): 0.5-2.0 mm
Conductivity (mega Ohms at 170° F.): 40-60

EXAMPLE 2

The composition prepared in Example 1 was applied onto various types of metal panels in laboratory as follows by two different methods. Test panels are purchased from major panel manufactures and are usually 3"×6"or 4'×6"in size. Test panels are obtained from ACT and represent several substrates:

a. General Motors unpolished cold rolled steel
b. General Motors 16-18E hot dip galvanized
c. General Motors 16-90E electrogalvanized
d. Chysler G60/A01 galvaneal In addition, aluminum test panels of several alloys such as 3003 and 5182 were also directly obtained from major aluminum mills such as Alcoa.

Before coating, all test panels are cleaned with Xylene and hexane. When dry, the panel weight was recorded to 1/10,000th of a gram on a precise analytical balance (such as a Mettler). The lubricant was applied to test panels at ambient conditions by one of two methods.

1. Method 1: Placing the test panel on a warm hot plate (surface temperature approximately 200° F.) and brushing lubricant (warmed separately to 170° F. until lubricant is molten) onto the panel. Standard paint brushes with high melting polyalphaolefin bristles are used. Brushes are either two or three inches wide. An initial heavier application is made to ensure adequate coverage followed by a thirty minute cooling period. The panel is then once again placed on the hot plate and a clean brush used to remove excess coating to reduce coating weights to a specific weight. Panels are then cooled again and placed on the hot plate one final time to reflow the coating.

2. Method 2: Lubricant is dissolved at a specific concentration in a solvent such as trichloroethane by warming the mixture to 160° F. Test panels are immersed in the lubricant-solvent solution for five seconds, withdrawn from the solution and placed in a vertical position. A hot air gun is used to blow warm air over both sides of the test panel (panel held in upright position with a plastic hood and gun held 10–12 inches from metal surface) to dissipate the solvent and reflow the coating.

While being coated, test panels are always handled by the preparer wearing disposable latex gloves to prevent surface metal contamination. Coated panels are allowed to cool at ambient temperatures for sixty minutes. The coated panels were then reweighed again on the same scale and lubricant coating weights are then calculated and reported in milligrams per square foot.

The coating methods described above are adequate for only small laboratory applications and preparations. For commercial applications, the lubricant may be applied by one of three methods:

A. Warming the lubricant above its melt point and applied to a moving steel strip by an electrostatic spray. The steel strip will pass through an insulated chamber containing warm air approximately at 100° F. and dual sets of application spray blades.

B. Diluting the lubricant in a solvent such as Xylene or SC-150 at a concentration of 5.0 to 15.0 weight percent. The moving steel strip is passed through a bath of the lubricant or a series of coating rolls apply the lubricant from the pan onto the strip. A series of ovens are used to dissipate the solvent, reflow the coating and cool the lubricant coating to ambient temperature.

C. Applying the lubricant in a molten form (temperature above the melt point) to a moving steel trip by a series of coating rolls. A series of ovens are used to reflow the coating and a waterfall quench is used to cool the lubricant coating to ambient temperature.

Despite the variety of coating methods, the lubricant, according to the present invention, provides a transparent, smooth film (which is hard yet pliable) on all types of metal with excellent surface adhesion and wetting properties providing a homogeneous and consistent film coating weight 25 mg/ft$^2$ to a maximum of 250 mg/ft$^2$.

EXAMPLE 3

Two test methods are described herein for evaluating the lubrication performance of the described invention in Example 1.

The solid film prelube composition prepared in Example 1 was tested to determine its forming and drawing characteristics on four steel substrates using the double draw bead simulator. 2"×12" test strips were coated as described in Method 1 of Example 2. Four test substrates used were four listed in Example 2. They were cold rolled steel, hot dip galvanized, electrogalvanized and galvaneal. All four steel substrates are currently in use by major manufacturers.

Solid film composition was applied to an area of 2"×5" on both sides at one end of each strip. Test strips were aged 24 hours at ambient temperature prior to testing. Three test strips were produced for each lubricant of each steel substrate type. Average coating weights were 100+/−mg/ft$^2$. Test strips were then drawn through a pair of mated dies containing a series of three fixed draw bead surfaces in an A shape configuration. Strips were placed in fixed grips at one end with a grip pressurization of 3,000 psi. Strips were pulled a total distance of five inches through the dies at the rate of 100 inches per minute, a total downward force of 11,000 pounds exerted on the strips. An individual coefficient of friction is calculated for each coated strip followed by an average coefficient of friction for each set of three test strips for each lubricant and substrate combination.

Coefficients of friction are calculated using the following equation:

$$\mu = \frac{B - A}{\text{pi} \times c}$$

$\mu$ is coefficient of friction
A is roller draw load
B is fixed draw load
C is fixed draw normal load A and B would represent the pulling forces, while C is the normal force. Pi is in the denominator to compensate for bead geometry.

One commercial F.D.A. approvable lubricant was evaluated for comparative purposes. In comparison, average coefficients of friction are listed below:

| | AVERAGE COEFFICIENT OF FRICTION | | | |
|---|---|---|---|---|
| Lubricant | Cold Rolled Steel | Hot Dip G. | Electro-G. | Galvaneal |
| Composition A | 0.0867 | 0.0913 | 0.0674 | 0.0831 |
| Commercial Lubricant | 0.1693 | 0.1724 | 0.1563 | 0.1670 |

The solid film prelube composition described in Example 1 provided better lubrication (based on lower average coefficients of friction) versus the commericial lubricant on all four steel substrates evaluated.

For aluminum lubrication studies, a moving-film stationary sled (MOFISS) method is used to determine the coefficient of friction for a specific lubrication on aluminum alloys. In this test, a horizontal block sled with three contact points with the test surface is moved across an aluminum test panel coated with a film of test lubricant. 4×12 inch test panels of Alcoa 3004-H19 aluminum alloy was used as the test substrate. Test lubricants are applied to the test substrate via dilutions with hexane and draw bars resulting in dried coating weights of 70–80 mg/ft$^2$. A drive mechanism is connected to the block sled via a strain gauge. The strain gauge is attached to a Sensatec Model 4500 meter and a Bausch and Lomb Omnigraphic 2000 X-Y recorder. Three individual two inch runs are made across each test panel, the block sled being pulled parallel to edge of test panels against the grain of the metal. The X-Y recorder provides a print out of the sled activity. A horizontal line is drawn through each of the three print outs which best represents average values. The three distances are measured in centimeters from the baseline. These three values are multiplied by 0.02 and averaged for the coefficient of friction. One commercial F.D.A. approvable lubricant was evaluated for comparative purposes. In comparison, average coefficients of friction are listed below:

| Lubricant | Average Coefficient of Friction |
|---|---|
| Composition A | 0.121 |
| Commercial Lubricant | 0.183 |

The solid film prelube described in Example 1 provided better lubrication (based on lower average coefficient of friction) versus the commercial lubricant on the aluminum substrate evaluated.

EXAMPLE 4

The solid film prelube composition prepared in Example 1 above was evaluated to determine whether it would provide the necessary corrosion protection required for metal substrates during long periods of storage and transit in varying conditions of humidity and temperature. The Cleveland condensing humidity cabinet is one of an accelerated nature whereby exposure to the combined adverse conditions of temperature and humidity are increased thereby reducing the time factor for practical reasons.

Coatings were evaluated on 4"×6" test panels of two substrates listed in Example 2: unpolished cold rolled steel and 3003H14 aluminum. Panels were coated via Method 1 as described in Example 2. Coatings were applied to achieve dry coating weights of 150±10 mg/ft$^2$ to one side of each test panel. Panels were then aged 24 hours at ambient temperatures prior to testing.

The test chamber consisted of an atmosphere of condensing humidity at 100° F. and 100% humidity. Water vapor circulated continually in the chamber, condensing on the coated surfaces of test panels facing the internal chamber of the test cabinet. Water vapor condensed on the coated surfaces of the panels continually washing the panel surfaces. Panels were always handled while wearing disposable latex gloves to prevent surface contamination on the coatings from salts and oils commonly found on human skin. Panels were examined every 24 hours and testing concluded after 20 days exposure. Test panels were placed at fifteen degree angle of incline (from the vertical on the chamber). Results are summarized below:

| | Cold Rolled Steel | Aluminum |
|---|---|---|
| Composition A | 5% scattered stain | No stain |

The solid film prelube composition described in Example 1 provided excellent corrosion protection of both metal substrates.

EXAMPLE 5

Cleanability, defined as the total removal of a solid film prelube coating from metal substrate, is important. After metal containers are formed, they will be processed through a variety of operations including removability in order to prevent contamination of food and beverage products processed and packaged in such containers.

For this reason, the solid film prelube composition described in Example 1 was tested for its removability via standard aqueous alkaline cleaners (at their recommended operating parameters) that are used in the U.S. manufacturing industry. Cleanability tests were run in a power spray wash unit, a self-enclosed system where alkaline cleaner solution is recirculated in a closed loop system. Cleaner solution is continuously heated in line and is applied to test panels hanging within the test chamber over a range of application pressures from five to thirty-five psi. Solid film prelube composition described in Example 1 was applied to test panels (4"×6") of four substrates described in Example 2 via laboratory coating described in Example 2. The four test substrates were cold rolled steel, hot dip galvanized, electrogalvanized and galvaneal. Coating was applied to one side of the test panels to achieve a dry coating weight of 75+/−10 mg/ft$^2$.

Two cleaning schemes were used, using powdered alkaline cleaners produced by Parker-Amchem. Two regiments are described below:
1. Parco 1500 C run at a concentration of two ounces per gallon at temperature of 105°+/−1° F. Panels were exposed for two minutes to a spray solution applied at 20 psi.
2. Parco 2331 run at a concentration of one ounce per gallon at temperature of 120°, 130° and 140° F. Panels were exposed for one minute to a spray solution applied at 20 psi. Temperature variance for all three application temperatures was a plus or minus one degree.

Following both cleaning schemes, panels were rinsed for thirty seconds in a deionized water rinse spray applied at 20 psi. Panels were then fully immersed in a saturated aqueous saturated aqueous copper sulfate solution (slightly acidic) which deposits a uniform copper coating on all cleaned areas. This presents an excellent visual record of the degree of the cleanability. Results are presented below:

| | DEGREE OF CLEANABILITY | | | |
|---|---|---|---|---|
| | Cold Rolled Steel | Hot Dip G. | Electro-G. | Galvaneal |
| 1. Parco 1500C. at 105° F. | 100% Clean | 100% Clean | 100% Clean | 100% Clean |
| 2. Parco 2331 | | | | |
| at 120° F. | 100% Clean | 100% Clean | 100% Clean | 100% Clean |
| at 130° F. | 100% Clean | 100% Clean | 100% Clean | 100% Clean |
| at 140° F. | 100% Clean | 100% Clean | 100% Clean | 100% Clean |

The solid film prelube composition described in Example 1 was easily removed on all test substrates with both of the automotive alkaline cleaners at their recommended operating conditions.

I claim:

1. A solid film prelube composition suitable for use forming metal containers subject to contact with food and beverage consisting essentially of:

| Ingredients | % by Weight |
|---|---|
| A. As a primary lubricant, a C14-C22 fatty acid | 75-95 |
| B. As a plasticizer-supplemental lubricant, butyl stearate | 5-25 |
| C. As a film former, an ethylene acrylic acid copolymer | 0.5-2 |
| D. As an antioxidant, 2,6-di-tertiary-butyl-para-cresol | 0-2 | with ingredients A-D being FDA approved for incidental contact with food, said composition being further characterized as being applied in a molten state at a temperature at least 5° F. above its melting point.

2. The solid film prelube composition of claim 1 where A is 88% by weight of 12-hydroxy stearic acid, B is 10% by weight, C is 1% by weight and D is 1% by weight.

3. The solid film prelube composition of claim 1 that is compatible with and designed to be used on all ferrous and non-ferrous metals.

4. A solid film prelube composition of claim 1 that is compatible with all forming operations for the production of containers used in processing and packaging of food and beverages at coating weights from 25 to 350 mg/ft$^2$.

* * * * *